US009759868B2

(12) United States Patent
Cucci et al.

(10) Patent No.: US 9,759,868 B2
(45) Date of Patent: Sep. 12, 2017

(54) STRUCTURES FOR PREVENTING DICING DAMAGE

(71) Applicant: INTERNATIONAL BUSINESS MACHINES CORPORATION, Armonk, NY (US)

(72) Inventors: Brett Cucci, Callicoon, NY (US); Paul F. Fortier, Richelieu (CA); Jeffrey P. Gambino, Portland, OR (US); Robert K. Leidy, Burlington, VT (US); Qizhi Liu, Lexington, MA (US); Richard J. Rassel, Essex Junction, VA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/933,705

(22) Filed: Nov. 5, 2015

(65) Prior Publication Data
US 2017/0131477 A1   May 11, 2017

(51) Int. Cl.
G02B 6/30 (2006.01)
G02B 6/13 (2006.01)

(52) U.S. Cl.
CPC ....... *G02B 6/30* (2013.01); *G02B 6/13* (2013.01)

(58) Field of Classification Search
CPC .................................. G02B 6/13; G02B 6/30
USPC ........................................................... 385/49
See application file for complete search history.

(56) References Cited

U.S. PATENT DOCUMENTS

| 5,351,328 | A | 9/1994 | Kakii et al. |
| 6,866,426 | B1 * | 3/2005 | Steinberg ................. G02B 6/30 385/65 |
| 6,879,757 | B1 | 4/2005 | Zhou et al. |
| 6,888,989 | B1 | 5/2005 | Zhou et al. |
| 8,366,328 | B2 | 2/2013 | Chen et al. |
| 8,692,350 | B2 | 4/2014 | Nakazawa et al. |
| 2015/0301290 | A1 * | 10/2015 | Fujiwara .............. G02B 6/3838 385/83 |

(Continued)

FOREIGN PATENT DOCUMENTS

| JP | 02256008 | 10/1990 |
| JP | 3014035 | 2/2000 |

(Continued)

OTHER PUBLICATIONS

Green et al., "Silicon photonic wire circuits for on-chip optical interconnects," Advanced Fabrication Technologies for Micro/Nano Optics and Photonics, vol. 6883, 2008, pp. 1-10, New York.

(Continued)

*Primary Examiner* — Jerry Blevins
(74) *Attorney, Agent, or Firm* — Steven Meyers; Andrew M. Calderon; Roberts Mlotkowski Safran Cole & Calderon, P.C.

(57) ABSTRACT

The disclosure relates to semiconductor structures and, more particularly, to structures for preventing dicing damage on photonics wafers. The structure includes: an optical waveguide structure to optical fiber interface formed on an integrated circuit; and a groove formed in a substrate and which includes a structure preventing a fluid pressure of a dicing operation from damaging the substrate along the groove.

20 Claims, 5 Drawing Sheets

(56) References Cited

U.S. PATENT DOCUMENTS

2015/0316723 A1* 11/2015 Taylor .................... G02B 6/421
385/2

FOREIGN PATENT DOCUMENTS

JP         3457823        8/2003
JP         4074563        9/2008

OTHER PUBLICATIONS

Lindenmann et al., "Photonic wire bonding: a novel concept for chip-scale interconnects," Optics Express, Jul. 30 2012, pp. 17667-17677, vol. 20, No. 16, Germany.

* cited by examiner

STRUCTURES FOR PREVENTING DICING DAMAGE

BACKGROUND

The present invention relates to semiconductor structures and, more particularly, to structures for preventing dicing damage on photonics wafers.

Silicon photonics chips are being developed for high speed interconnects between dies. Waveguides can be built on silicon on insulator (SOI) wafers and can be integrated with CMOS devices. In order to make such integration, though, a connection must be made between an "off-chip" optical fiber and the waveguide structure, itself. Out-of-plane coupling uses an optical grating to couple light from the optical fiber to the waveguide structure, but this limits the optical signal to one wavelength. In-plane coupling, on the other hand, allows broadband transmission (multiple wavelengths, and therefore higher bandwidth). However, achieving high coupling efficiency with in-plane coupling is difficult.

A reason for loss for in-plane coupling is that the core of the optical fiber has a much larger diameter than the Si waveguide structure. The loss can be reduced using a groove or channel underneath the Si waveguide, for improved coupling. However, the inventors of the present invention have found that the groove results in a thin membrane that is easily damaged during dicing. By way of experimental results, it has been found that due to water jet pressure during dicing and rinsing, damage to the waveguide structures results at the thinned membrane. When water jet pressures are lowered to the minimum possible pressures in which dicing progress can support, there was still breakage of the membrane, albeit to a lesser extent. However, with the lowered water jet pressures, wafers become contaminated with Si dust which can affect assembly, reliability and optical coupling.

SUMMARY

In an aspect of the disclosure, a structure comprises: an optical waveguide structure to optical fiber interface formed on an integrated circuit; and a groove formed in a substrate and which includes a structure preventing a fluid pressure of a dicing operation from damaging the substrate along the groove.

In an aspect of the disclosure, a structure comprises: an optical fiber which is coupled to an optical waveguide structure, positioned within a groove formed in a substrate; and a structure of the groove which prevents a pressurized fluid of a dicing operation from damaging the substrate along the groove.

In an aspect of the disclosure, a method comprises: forming a groove in a substrate which is structured as a coupling channel for an optical fiber and optical waveguide structure interface; and forming a structure within the groove to prevent pressurized fluid during dicing operation from damaging substrate along the groove.

BRIEF DESCRIPTION OF THE DRAWINGS

The present disclosure is described in the detailed description which follows, in reference to the noted plurality of drawings by way of non-limiting examples of exemplary embodiments of the present disclosure.

DETAILED DESCRIPTION

The present invention relates to semiconductor structures and, more particularly, to structures for preventing dicing damage on photonics wafers. More specifically, the present invention is directed to a structure which prevents the water pressure of dicing operations from damaging the waveguide structure at a thinned portion of the substrate. Advantageously, the structures of the present invention will reduce water pressure within a channel of the waveguide structure during a wafer dicing process thus limiting any damage to the waveguide structure, itself. Alternatively, the structures described herein can also prevent damage during the wafer dicing process by hardening the surface of the channel formed for optical coupling of the waveguide structure and the optical fiber.

In embodiments, the structure is a V-groove channel with a structure formed in a substrate of the integrated circuit in which an optical fiber is formed. The structure can include, e.g., a tapered undercut, which will reduce water pressure during a wafer dicing process. In additional or alternative embodiments, the structures can include an extended groove or channel, a plurality of vias, an angled V-groove or a damaged surface of the channel or any combination thereof. Each of the additional or alternative structures will prevent the water pressure during a wafer dicing process from damaging the waveguide structure.

The structures of the present invention can be manufactured in a number of ways using a number of different tools. In general, though, the methodologies and tools are used to form structures with dimensions in the micrometer and nanometer scale. The methodologies, i.e., technologies, employed to manufacture the structures of the present invention have been adopted from integrated circuit (IC) technology. For example, the structures of the present invention are built on wafers and are realized in films of material patterned by photolithographic processes on the top of a wafer. In particular, the fabrication of the structures of the present invention uses three basic building blocks: (i) deposition of thin films of material on a substrate, (ii) applying a patterned mask on top of the films by photolithographic imaging, and (iii) etching the films selectively to the mask.

Figure 1:
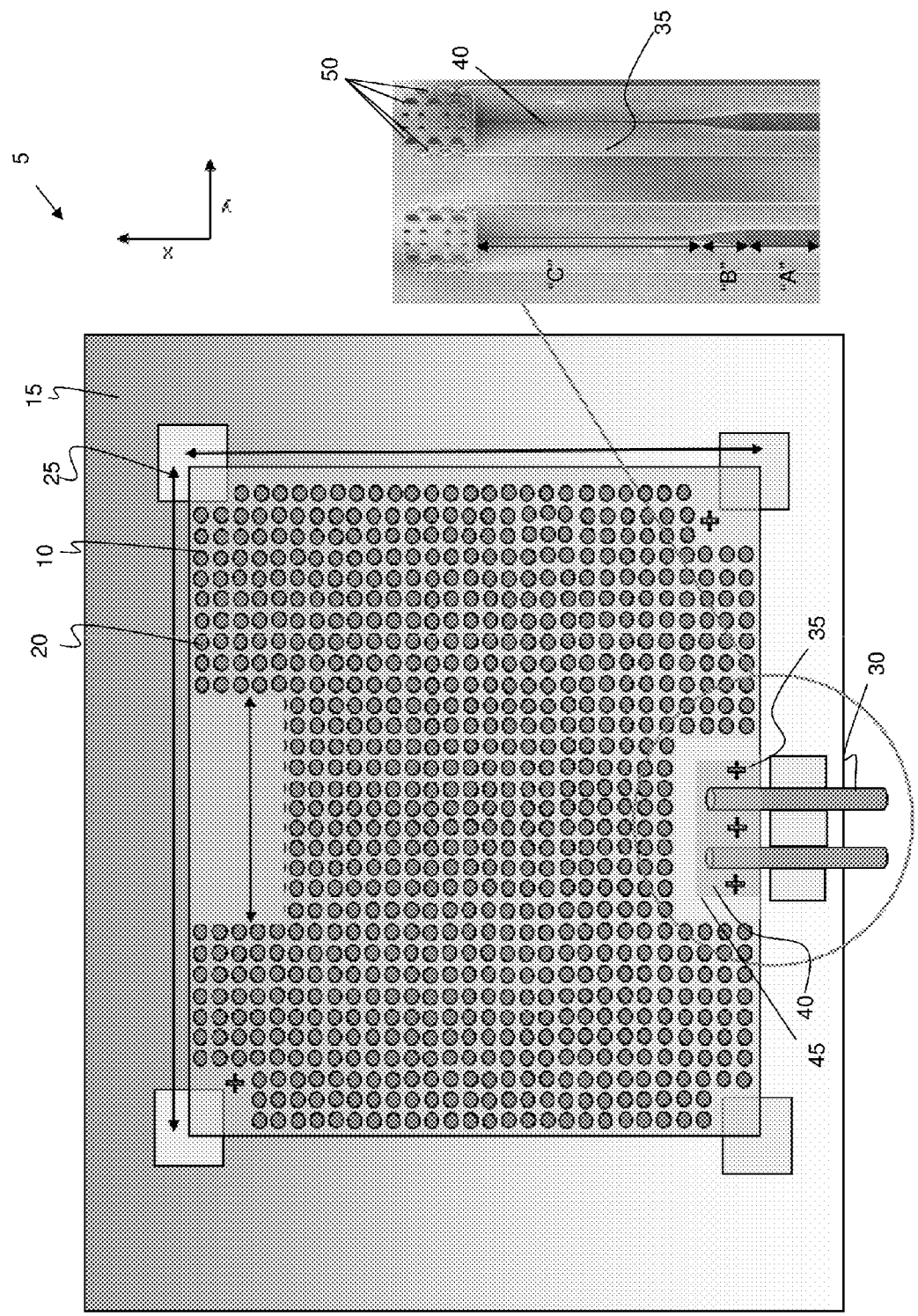
FIG. 1 shows a top view of a photonics chip positioned on an interposer with optical fibers and fabrication processes in accordance with aspects of the present disclosure.

FIG. 1 shows a top view of a photonics chip positioned on an interposer with optical fibers in accordance with aspects of the present disclosure. More specifically, the structure 5 includes a substrate 10 (e.g., photonics chip) mounted on an interposer 15. In embodiments, the photonics chip 10 includes a waveguide structure (See, e.g., FIGS. 3 and 4) and a plurality of connections 20. In embodiments, the plurality of connections 20 are composed of a ball grid array and more specifically a plurality of solder balls. In embodiments, the solder balls can be, e.g., controlled collapse chip connections (C4 connections). An underfill material can be used to fill gaps or spaces between the C4 connections, when the photonics chip 10 is mounted to the interposer 15.

C4 connections is a process for interconnecting semiconductor devices, such as integrated circuit chips to external circuitry with solder bumps that have been deposited onto chip pads. The solder bumps are deposited on the chip pads on the top side of the wafer during the final wafer processing step. In order to mount the chip to external circuitry (e.g., a circuit board or another chip or wafer), it is flipped over so that its top side faces down, and aligned so that its pads align with matching pads on the external circuit, and then the solder is reflowed to complete the interconnect. This is in contrast to wire bonding, in which the chip is mounted upright and wires are used to interconnect the chip pads to external circuitry.

Still referring to FIG. 1, the photonics chip 10 can be mounted onto polymer spacers 25, which are positioned between the photonics chip 10 and the interposer 15. The interposer 15 can be, for example, a glass interposer. One or more optical fibers 30 are optically coupled to the photonics chip 10 and more specifically to the waveguide structure. In embodiments, the optical fibers 30 are positioned within a cavity 35 (e.g., optical cavity) formed within the photonics chip 10. In embodiments, the cavity 35 can be a channel, e.g., V-shaped groove 35, with a tapered bottom section 40 (which runs along the <110> direction). The V-shaped groove 35 can be filled with $SiO_2$ or an optical epoxy material 45 (hereinafter referred to as optical epoxy).

As described herein, the V-shaped groove 35 includes a tapered bottom section 40 formed in the substrate 10 which can be composed of basically three sections, "A", "B" and "C", each of which includes a flattened bottom section 40 having a different dimension, with section "B" providing a tapered transition between section "A" and section "C". In embodiments, the bottom of each of the three sections "A", "B" and "C" can be flat, with the flat bottom being gradually narrowed or tapered from section "A" to a tip or end of section "C". It should be understood by those of skill in the art that although three sections are shown, one or more sections with a flattened and tapered bottom is also contemplated by the present invention.

In embodiments, section "A" can be positioned above the optical fiber 30, and can be about 120 μm to about 130 μm in length, section "B" can be about 50 μm to about 70 μm in length and section "C" can be about 200 μm in length, based on a particular technology node and/or fiber optic characteristics. The width of each of the flattened bottom sections can be tapered, with section "A" being about 20 μm to about 100 μm, leading to section "C" which can have a taper at an end thereof of about "0" μm. In any of the embodiments, the flat, tapered bottom sections will significantly reduce the water pressure from the dicing operations, thus limiting any damage to the substrate or other structures.

It should be understood that the sections "A", "B" and "C" can be of different lengths and dimensions, e.g., taper, depending on the particular technology nodes and water jet pressure of the dicing operation. By way of more specific example and still referring to FIG. 1, the V-shaped groove 35 can have a pitch of approximately 500 μm and a length of approximately 650 μm. However, it should be understood that the V-shaped groove 35 can include other dimensions based on the structural dimensions (e.g., width, height and length) of the waveguide structure and optical fibers 30, as well as other design and engineering criteria. For example, the V-shaped groove 35 can be dimensioned to accommodate any type of optical fiber used in photonics chip packaging, where each of the different designs include a flattened, tapered bottom section(s) 40.

As further shown in FIG. 1, a plurality of vias 50 can also be formed in the substrate 10, proximate to the coupling of the waveguide structure and the optical fiber 30. The vias 50 are optimized to reduce water pressure. For example, in embodiments, the vias 50 can include at least two rows placed at an end of the groove (channel) 35, each of which are positioned on sides of the waveguide structure. These vias 50 also can be a single row or other configuration, and can be formed with or without the different flat, tapered bottom sections. The vias 50 can have a diameter of about 10 μm, which are large enough to relieve the water pressure within the V-shaped groove 35 during the dicing operation.

The methodologies, i.e., technologies, employed to manufacture the flattened bottom tapered section(s) 40 and the vias 50 have been adopted from integrated circuit (IC) technology. For example, the vias 50 can be formed by a lithography and etching processes known to those of ordinary skill in the art. More specifically, to form the vias 50 a resist can be formed on the substrate 10, following by exposure to energy (e.g., light) to form a pattern. An etching processes, e.g., reactive ion etching (RIE), can then be performed through the pattern to form openings (vias 50) within the substrate 10, on the sides of a waveguide structure (which is formed after via formation). After via formation, the resist can be removed by a conventional stripping process, e.g., oxygen ashing process.

As to the formation of the flat, tapered bottom section(s) 40, a dry etching process can be used to form the initial cavity structure 35, e.g., V-groove, on an underside of the substrate 10 (e.g., Si substrate). The etching can continue with a wet etching process to form the flattened tapered bottom section(s) 40. In embodiments, the wet etching can be a chemistry of KOH, etching in the <111> plane of the substrate 10.

Figure 2:
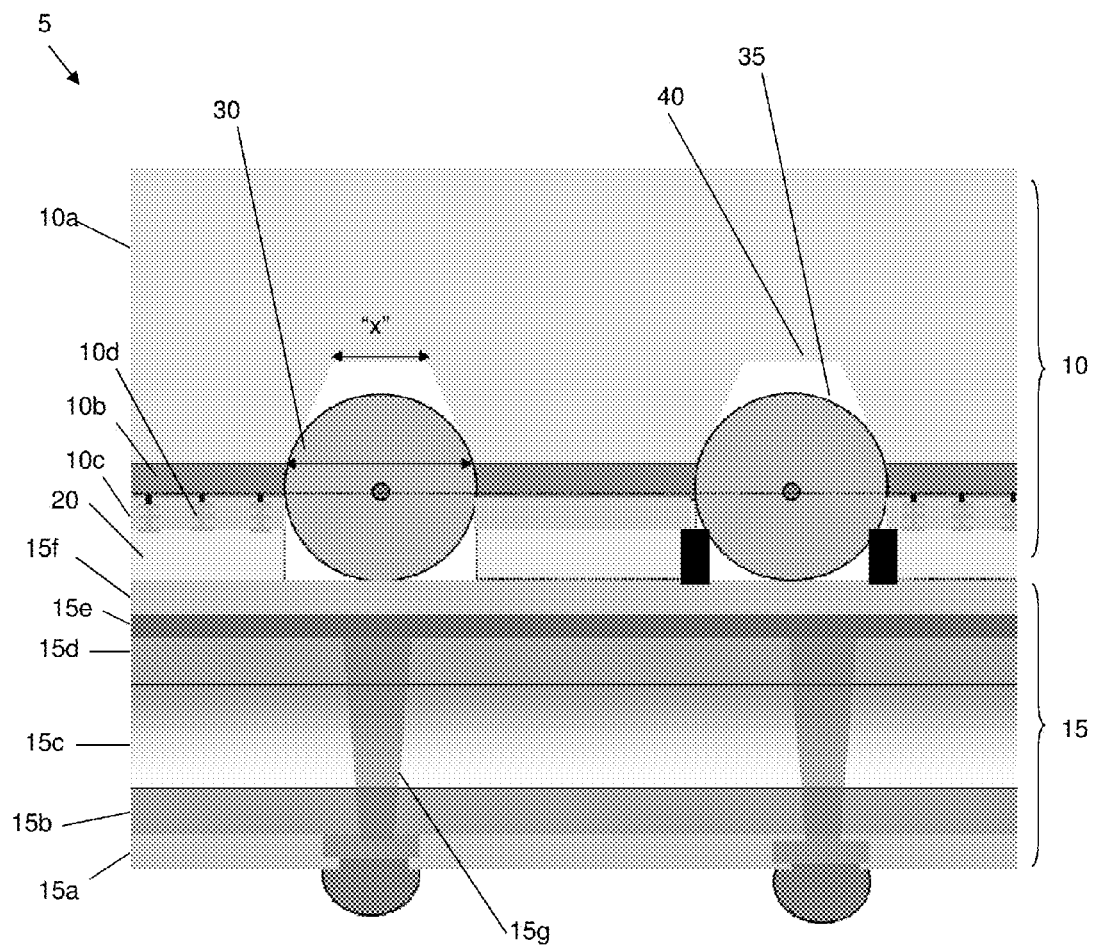
FIG. 2 shows a cross sectional view of the photonics chip positioned on an interposer with optical fibers and fabrication processes in accordance with aspects of the present disclosure.

FIG. 2 shows a cross sectional view of the photonics chip package in accordance with aspects of the present disclosure. As shown in FIG. 2, the structure 5 includes the photonics chip 10 mounted on the interposer 15, with the optical fibers 30 each of which being positioned within separate V-shaped groove 35 (e.g., optical cavity) formed within the photonics chip 10. In embodiments, the V-shaped groove 35 includes a flattened, tapered bottom section 40 as described herein. In this cross sectional view, the flattened, tapered bottom section 40 has a dimension "x" of about 60 μm and a width of approximately 125 μm (or other dimensions matched to a diameter of the optical fibers 30). As should be understood by those of ordinary skill in the art, the dimension "x" will vary along the length of the V-shaped groove 35, with the taper reaching to approximately 0 μm (or 0 μm). For illustrative purposes, the V-shaped groove 35 is not filled with the epoxy material.

In embodiments, the photonics chip 10 can include several layers including a semiconductor substrate 10a, an insulator layer 10b (buried oxide layer (BOX) and back end of the line (BEOL) metal fill layers 10c with guardring structures 10d formed therein. The photonics chip 10 further includes the plurality of solder connections represented at reference numeral 20. The interposer 15 can include several layers including, e.g., a passivation layer 15a, a polymer layer 15b, a glass interposer layer 15c, a polymer layer 15d, a copper layer 15e and a passivation layer 15f. The interposer 15 can further include a conductive (metal) via connection 15g as should be understood by those of skill in the art. It should be understood by those of skill in the art that the photonics chip 10 and interposer 15 can include other layers depending on the design and engineering considerations for the particular application, and each of the photonics chip 10 and interposer 15 can be fabricated using conventional CMOS processes.

Figure 3:
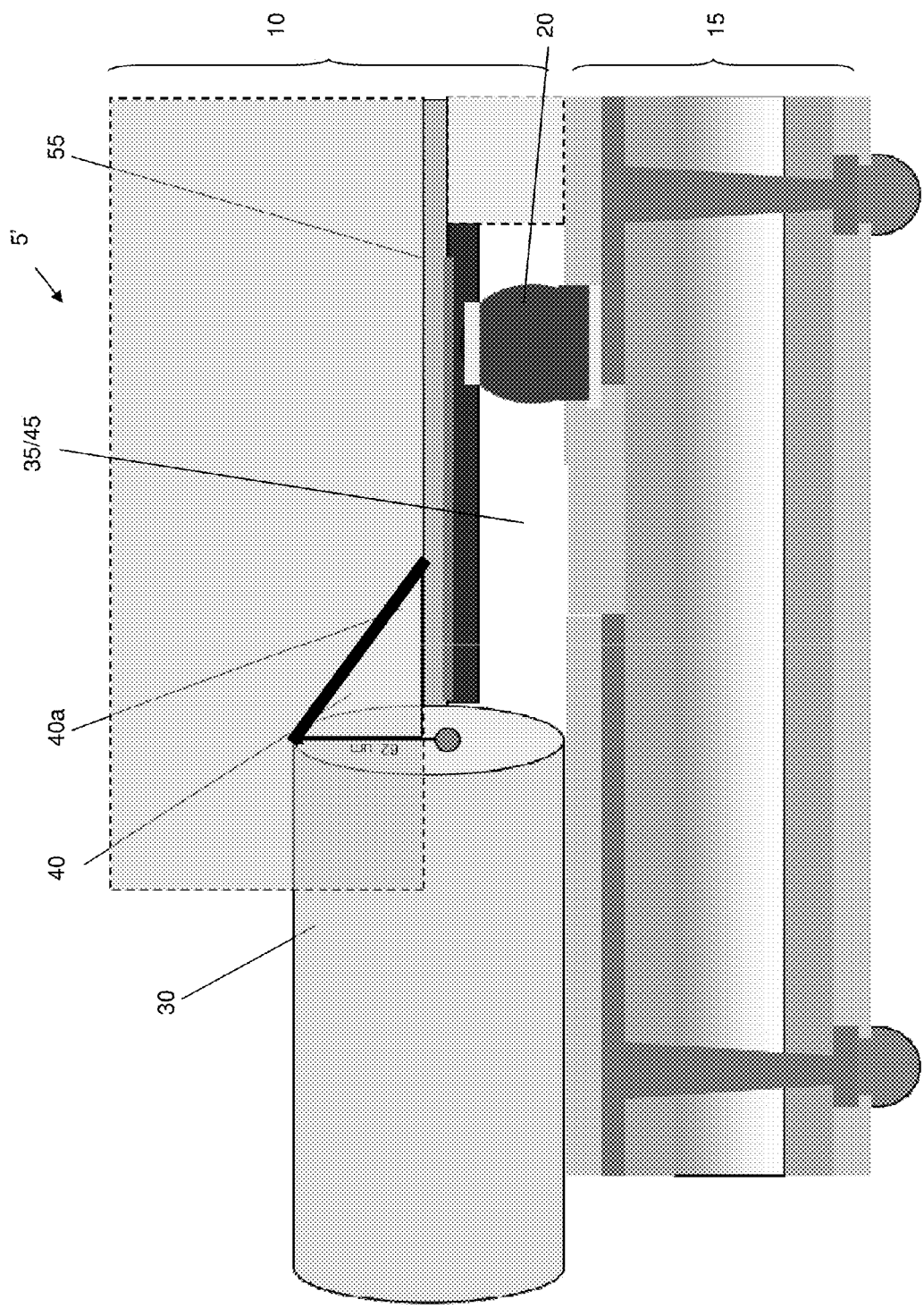
FIG. 3 shows another cross sectional view of the photonics chip positioned on an interposer with optical fibers and fabrication processes in accordance with aspects of the present disclosure.

FIG. 3 shows a cross sectional view of the photonics chip positioned on an interposer with optical fibers in accordance with aspects of the present disclosure. As shown in FIG. 3, the structure 5' includes the photonics chip 10 mounted on the interposer 15, with the optical fibers 30 positioned within the V-shaped groove 35 (e.g., optical cavity). In embodiments, the groove 35 has a damaged surface 40a at its tapered end, for example. In embodiments, the damaged surface 40a is ion implant damage caused by an ion implant process of, e.g., germanium, arsenic or boron, at a surface of the groove 35. In embodiments, the energy and dosage of the implant can be such that the damage extends to a depth of approximately 200 Å to about 500 Å. In this and other embodiments, the structure can include any combination of the damaged surface, flat, tapered bottom section and/or the plurality of vias (and extended region as shown in FIG. 4).

In this example view, the groove 35 (e.g., optical cavity) is shown to accommodate the optical fibers 30 and portions of the waveguide structure 55 which are formed on an integrated circuit. As should be understood by those of ordinary skill in the art, each embodiment includes the optical fibers 30 and the waveguide structure 55 formed on an integrated circuit. The optical cavity 35 is filled with epoxy material 45. The photonics chip 10 further includes the plurality of solder connections 20, connecting the photonics chip 10 to the interposer 15.

Figure 4:
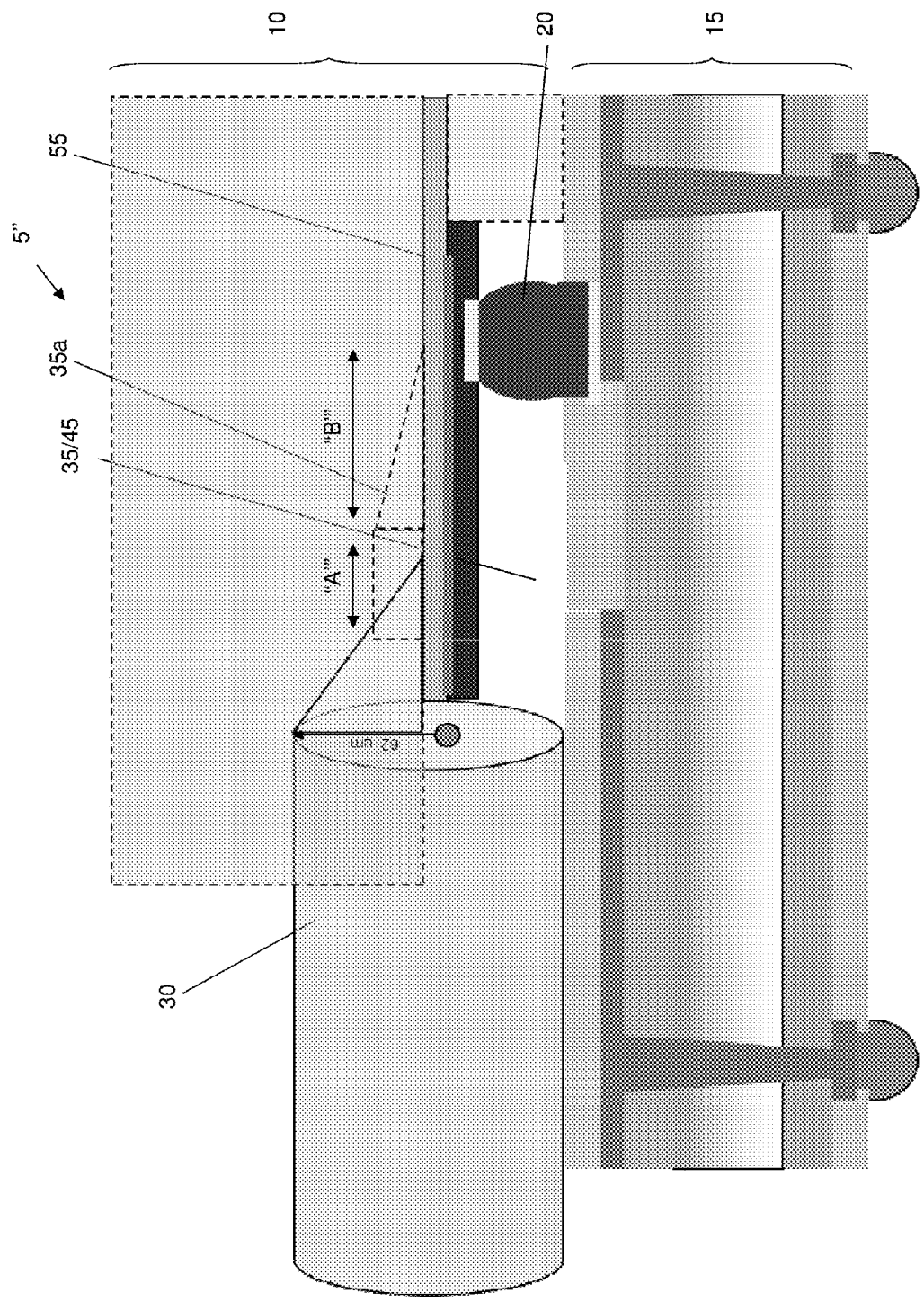
FIG. 4 shows a cross sectional view of the photonics chip positioned on an interposer with optical fibers and fabrication processes in accordance with additional aspects of the present disclosure.

FIG. 4 shows a cross sectional view of the photonics chip positioned on an interposer with optical fibers in accordance with aspects of the present disclosure. As shown in FIG. 4, the structure 5" includes the photonics chip 10 mounted on the interposer 15, with the optical fibers 30 positioned within the groove 35 (e.g., optical cavity). In embodiments, the groove 35 is filled with epoxy material 45.

As further shown in this view, the groove 35 includes an extended cavity or groove region 35a. The extended region 35a can be formed by a dry etching process, followed by a wet etching process as described herein. Although the dimensions of the extended region 35a can vary from about 60 μm to about 500 μm, with a first region "A'" being approximately 60 μm deep and the second region "B'" extending from about 60 μm to 0 μm in depth, other dimensions are also contemplated by the present invention. In this way, the extended region 35a has a tapered depth. As should be understood by those of skill in the art, the extended region 35a will reduce the water pressure of the dicing operation, thus limiting any damage to the waveguide structure 55.

Figure 5:
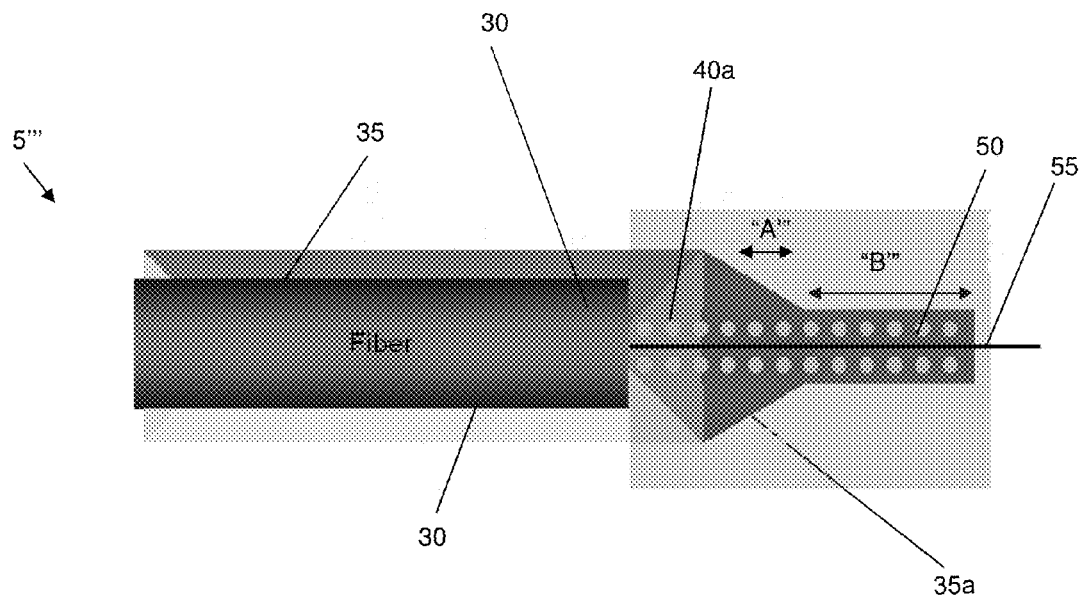
FIG. 5 shows a top sectional view of the photonics chip with optical fibers and fabrication processes in accordance with aspects of the present disclosure.

FIG. 5 shows a top sectional view of the photonics chip with optical fibers in accordance with aspects of the present disclosure. As shown in FIG. 5, the structure 5'" includes the optical fibers 30 positioned within the groove 35 (e.g., optical cavity). As further shown in this view, the groove 35 includes the extended region 35a and the plurality of vias 50. The plurality of vias 50 are configured in a single row, each on opposing sides of the waveguide structure 55. The groove 35 can also include the damaged surface 40a, as well as the flat, tapered bottom section(s) as described herein.

Figure 6:
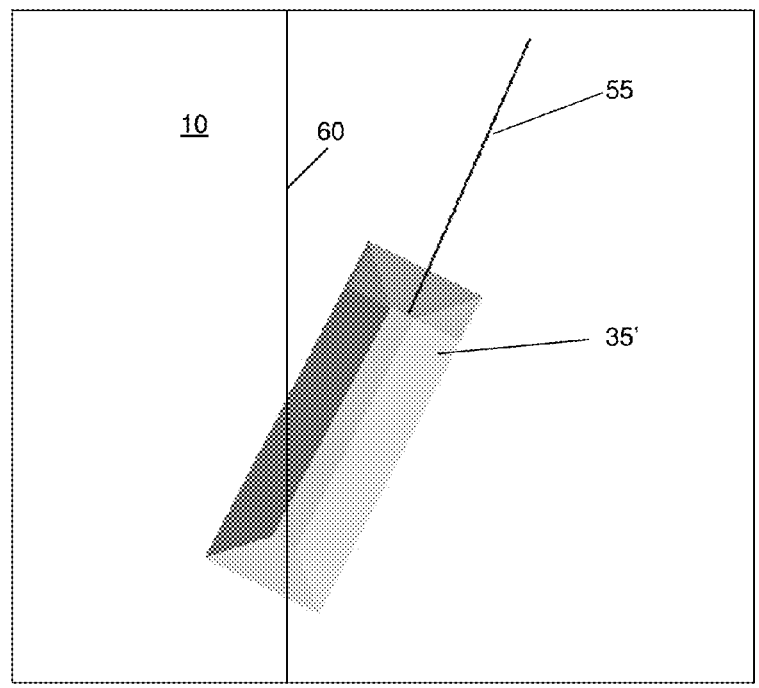
FIG. 6 shows a top sectional view of the photonics chip with optical fibers and fabrication processes in accordance with aspects of the present disclosure.

FIG. 6 shows a top sectional view of the photonics chip with optical fibers and fabrication processes in accordance with aspects of the present disclosure. As shown in FIG. 5, the structure 5"" includes the groove 35' (e.g., optical cavity) and waveguide structure 55, formed at an angle with respect to a dicing channel 60. In embodiments, the cavity 35' and the waveguide structure 55 are at an angle of 45° with respect to the dicing channel. As should be understood by those of ordinary skill in the art, as the dicing channel 60 is no longer aligned with the cavity 35' and waveguide structure 55, the high pressure water of the dicing process will not run along the thinned membrane, e.g., along the cavity, thus preventing damage to the substrate which otherwise may result along this channel.

The method(s) as described above is used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure, comprising:
   an optical waveguide structure to optical fiber interface formed on an integrated circuit; and
   a groove formed in a substrate and which includes a structure preventing a fluid pressure of a dicing operation from damaging the substrate along the groove,
   wherein the groove is a V-shaped groove that includes a flat, tapered bottom surface which narrows from a location above the optical fiber towards an end.

2. The structure of claim 1, wherein the structure is a plurality of vias in the substrate on opposing sides of the optical waveguide structure.

3. The structure of claim 2, wherein the plurality of vias have a diameter of about 10 μm.

4. The structure of claim 2, wherein the vias comprise at least two rows placed at an end of the groove, each of which are positioned on sides of the optical waveguide structure.

5. The structure of claim 1, wherein the structure is a damaged surface of the groove.

6. The structure of claim 5, wherein the damaged surface is ion implant damage that extends into a surface of the substrate.

7. The structure of claim 1, wherein the structure is an extension of the groove.

8. The structure of claim 7, wherein the extension of the groove has a tapered depth.

9. The structure of claim 1, wherein the groove and optical waveguide structure and optical fiber are positioned at an angle of 45° with respect to a dicing channel.

10. The structure of claim 1, wherein the V-shaped groove is filled with $SiO_2$.

11. A structure, comprising:
   an optical fiber which is coupled to an optical waveguide structure, positioned within a groove formed in a substrate; and
   a structure of the groove which prevents a pressurized fluid of a dicing operation from damaging the substrate along the groove,
   wherein the structure of the groove comprises a flat, tapered bottom surface which narrows from a location above the optical fiber towards an end.

12. The structure of claim 11, wherein the flat, tapered bottom surface includes a width that narrows from a location above the optical fiber to a terminating end.

13. The structure of claim 11, wherein the structure of the groove further comprises a plurality of vias in the substrate on opposing sides of the optical waveguide structure.

14. The structure of claim 13, wherein the vias have a diameter of about 10 μm.

15. The structure of claim 11, wherein the structure of the groove further comprises a damaged surface of the groove.

16. The structure of claim 15, wherein the damaged surface is ion implant damage.

17. The structure of claim 11, wherein the structure of the groove further comprises an angled position of 45° with the optical waveguide structure and optical fiber with respect to a dicing channel.

18. The structure of claim 11, wherein the structure further comprises a plurality of vias formed in the substrate along sides of the optical waveguide structure, an ion damaged surface of the groove, and an extension of the groove.

19. A method, comprising:
   forming a groove in a substrate which is structured as a coupling channel for an optical fiber and optical waveguide structure interface;
   filling the groove with epoxy material; and
   forming a structure within the groove to prevent pressurized fluid during dicing operation from damaging substrate along the groove,
   wherein the structure of the groove comprises a flat, tapered bottom surface which narrows from a location above the optical fiber towards an end.

20. The method of claim 19, wherein the structure comprises a plurality of vias formed in the substrate along sides of the optical waveguide structure, an ion damaged surface of the groove, a tapering of a bottom flat surface of the groove and an extension of the groove.

* * * * *